Sept. 23, 1924.
J. L. CREVELING
ELECTRIC REGULATION
1,509,396
Original Filed Feb. 3, 1917
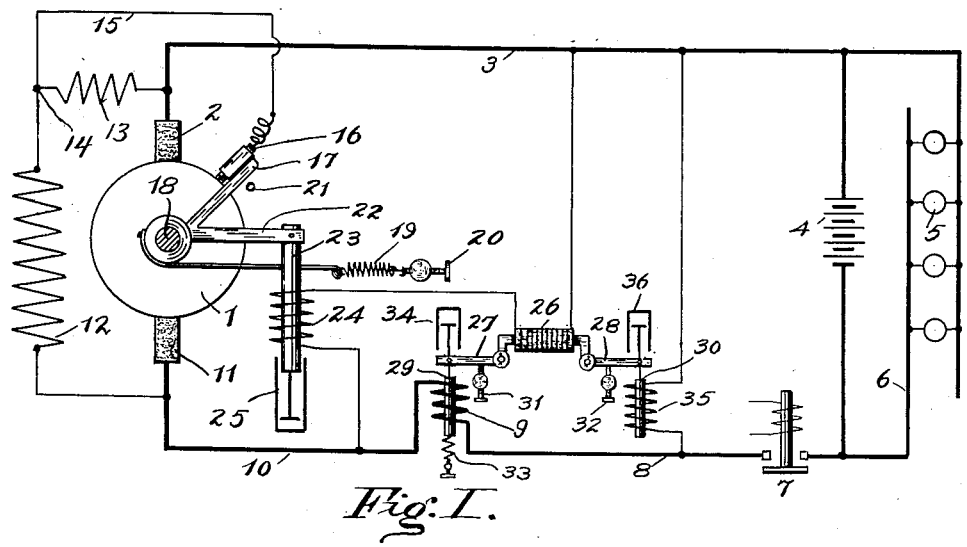
Fig. I.
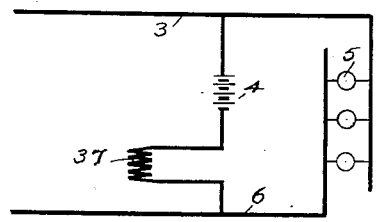
Fig. II.
INVENTOR.
John L. Creveling Patented Sept. 23, 1924.

1,509,396

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

Application filed February 3, 1917, Serial No. 146,412. Renewed December 22, 1922.

*To all whom it may concern:*

Be it known that I, JOHN L. CREVELING, a citizen of the United States, residing in White Plains, county of Westchester, and State of New York, have invented certain new and useful Improvements in Electric Regulation, of which the following is a description.

My invention pertains to that class of electric regulation wherein it is desired to regulate a dynamo or generator provided with field exciting poles and commutating poles and has for a particular object to provide means whereby the strength of said poles may be simultaneously regulated.

As my invention is particularly applicable to systems wherein a dynamo or generator driven at variable speeds is used to charge storage batteries and operate translating devices in conjunction therewith and wherein it is desired to automatically regulate the generator to compensate for speed changes and various conditions of the battery, it will be described with reference to such systems.

In the drawings, Fig. I. is a diagrammatic representation of one type of such system embodying the essentials of my invention.

Fig. II. is a diagrammatic representation of a portion of a system similar to that of Fig. I., showing one modification which may be made in the system of Fig. I.

In Fig. I., 1 represents the commutator of a dynamo, the positive brush 2 of which is connected as by lead 3 with the positive terminal of the storage battery 4 and the positive terminals of the translating devices 5 as indicated. The negative terminals of the translating devices 5 and storage battery 4 are connected with the lead 6 which is carried to one side of a suitable, automatic switch as indicated at 7, the opposite terminal of which is connected as by lead 8 with one end of the solenoid or winding 9, having its opposite end connected as by lead 10 with the negative brush 11 of the generator. 12 is the main field exciting winding, one end of which is connected with the lead 10 and the other with one end of the commutating winding 13, the remaining end of which is connected with the lead 3 as shown.

From a point 14 between the field winding and the commutating winding, the wire 15 is carried to the auxiliary brush 16 cooperating with the commutator 1. The brush 16 is carried by the movable arm 17 which is rotatable about the armature shaft 18. The spring 19, adjustable as by screw 20, tends to swing the arm 17 and brush 16 in a counter-clockwise direction, while the limit of such movement may be determined by any suitable stop, as for example 21, which may engage the lever 22 controlling the movement of the arm 17 and which carries at one extremity the core of magnetic material 23. I preferably adjust stop 21 so that the same will allow the spring 19 to revolve the brush 16 only to the extent that its center shall be in the same plane with the brush 2; and I so arrange the stop that it will by contact with the lever 17 limit the motion possible to the brush 16 in a clockwise direction in which direction it is moved when the core 23 is pulled downwardly.

The coil 24 surrounds the core 23 and when energized tends to draw the said core downwardly, while too sudden movement is prevented by the dashpot arrangement 25. The coil 24 is connected in shunt across the generator leads and has in series with such connection a suitable regulating device, in this instance indicated as the carbon pile 26.

The resistance of the pile 26 is controlled by the bell crank levers 27 and 28, each having a limb which engages the pile and each having another limb engaging the cores of magnetic material 29 and 30 respectively. The weight of the cores 29 and 30 tends to draw the levers 27 and 28 into contact with their limiting stops or adjustment screws 31 and 32 and, if desired, I may supplement the action of gravity by any suitable type of adjustable spring, as indicated for example at 33. The coil 9 when energized tends to raise the core 29 against the action of gravity and any other adjusting means as may be employed, as for example the spring 33, and tends to compress the pile 26 and lower the resistance thereof, while too sudden movement of the said coil 9 is restrained by the dashpot arrangement indicated at 34.

The coil 35 is placed in shunt across the generator mains and when energized tends to raise the core 30 and decrease the resistance of the pile 26, while too sudden movement is restrained by the dashpot 36.

In Fig. II., like numerals are used to indicate like parts and the only modification that this figure is intended to bring out is a difference in the location of the series coil which in Fig. I. is indicated at 9 and in series with the generator and responsive to the total output, for which may be substituted, if desired, the series coil 37 of Fig. II. in series with the battery circuit only and responsive to current in this circuit only, instead of the main generator output.

An operation of my invention is substantially as follows, referring particularly to Fig. I.:

If the generator be at rest or operating at low speed, the main switch 7 will be open and the translating devices 5 may be supplied by the battery 4 in a well known manner. The switch 7, the mere presence of which is indicated diagrammatically in the drawing, is preferably that well known type of automatic switch which will close the main circuit when the voltage of the generator is substantially equal to that of the battery 4 and open the circuit when the generator voltage falls very slightly below that of the battery. As many types of such switches are well known in the art, the detailed connections are purposely omitted for the sake of clearness and the presence of the switch merely indicated. If the generator have its speed increased until its voltage be in excess of that of the battery, the switch 7 will close and current will be supplied to the translating devices and the battery by the generator, the same flowing from the generator through lead 3 and returning through lead 6, switch 7, lead 8, coil 9, lead 10 and brush 11. I so adjust the spring 19 and the instrumentalities affecting the resistance 26 that when the generator is running at the lowest speed that it is possible for the same to charge the battery and with its full field excitation, the spring 19 will pull the brush 16 into such position that its center line will be in the same plane as that of the brush 2. Then the field coil 12 will be in effect in shunt across the brushes 2 and 11 as the brush 16 will bear upon some of the same commutator bars as the brush 2. This will cause the full voltage of the generator to be impressed upon the coil 12, while the commuting coil 13 will be practically short-circuited by the wire 15.

If now the generator speed be increased and its voltage raised until the currents supplied reach a maximum desired value, the same will flow through the coil 9 and will raise the core 29 smoothly against the action of dashpot 34 and decrease resistance 26 in a well known manner so as to cause the current flowing through the coil 24 to increase and draw the core 23 downwardly and smoothly against the action of dashpot 25 and swing the brush 16 in a clockwise direction and lower the potential difference across the coil 12 in a manner well known in the art. This will simultaneously increase the difference in potential between the brush 2 and the brush 16 and increase the current flowing in the commutating coil 13 as the generator main field is cut down and the function of the commutating coil becomes more valuable, as is well understood. The current value which shall not be exceeded may, of course, be adjusted by dimensioning the weight of the core 29 and other cooperating parts or by using an adjusting spring 33 as indicated. If at any time during the operation of the generator the voltage across the same or across any part of the system where it is desired to limit the voltage from exceeding a predetermined amount reach this predetermined value, the coil 35 will raise its core 30 and decrease the resistance 26 and cause the coil 24 to decrease the field excitation in the coil 12 to prevent this desired voltage from being exceeded and simultaneously increase the current in the commutating winding 13 as the main field is weakened and a commutating field becomes more valuable.

It will be obvious that the coil 35 may be connected across any part of the system wherein it is desired to limit the voltage, and it will be noted that if the coil 9 of Fig. I. be suppressed and the coil 37 of Fig. II. be used in its stead, the battery charging current will be limited in the same manner that the main generator current is limited in the system of Fig. I.

If the generator slow down, a reverse operation will take place.

From the foregoing it will be obvious that I have produced a system wherein both the current in a circuit or the voltage across a circuit may be automatically governed by devices which automatically control the output of the generator as desired and wherein as the field energization of the generator is reduced to hold the current or voltage within desired limits throughout wide speed changes a commutating field is simultaneously and automatically increased in such manner as to assist in commutation as the generator field weakens and the process of commutation requires more and more assistance.

It will be noted that when my invention is employed to charge a storage battery from a generator running at variable speeds, as for example in a car lighting system, the current will at all times be held from exceeding a predetermined value throughout speed changes; and if the battery become charged until its counter-electro-motive force be such that a voltage necessary to deliver this maximum current would be in excess of the maximum voltage to be held constant across the generator circuit by the voltage regulating means, the voltage regulating means by preventing such increase to take place will cause the battery charging current to gradually taper off and approach zero and thus prevent overcharging of the battery.

While I have described my invention with particular reference to a system wherein the coil 13 is a commutating coil, it is not necessarily limited to this particular use of the coil 13; and while shifting of the brush 16, by any means whatever, causes a change in the relative energization of coils 12 and 13, I have not broadly claimed all regulators operating to regulate a generator by the movement of the brush 16 and its effect upon the said coils, in this application, as the same is broadly covered in my copending application, Serial No. 335,616, filed Nov. 4, 1919.

I do not wish in any way to limit myself to any of the details of construction or exact modes of operation outlined above which are given merely to portray an example of an embodiment of my invention, for wide departure may be made without departing from the spirit and scope of my invention which is as set forth in the following claims.

What I claim is:

1. The combination with a generator having a field winding and a commutating winding, of means for simultaneously affecting said windings comprehending means for connecting said windings with the generator and varying the connection therewith.

2. The combination with a generator having a field winding and a commutating winding, of means for simultaneously affecting said windings comprehending means for connecting said windings with the generator, and automatic means for varying the connection therewith.

3. The combination with a generator having a field winding and a commutating winding, of automatic means for simultaneously affecting said windings comprehending means for connecting said windings with the generator and varying the connection therewith.

4. The combination with a generator having a field winding and a commutating winding in series therewith, of means for simultaneously affecting said windings comprehending means for connecting said windings with the generator and varying the connection therewith.

5. The combination with a generator having a field winding and a commutating winding in series therewith, of means for simultaneously affecting said windings comprehending means for connecting said windings with the generator, and automatic means for varying the connection therewith.

6. The combination with a generator having a field winding and a commutating winding in series therewith, of automatic means for simultaneously affecting said windings comprehending means for connecting said windings with the generator and varying the connection therewith.

7. The combination with a generator having a field winding and a commutating winding, of means for affecting the current in said windings comprehending means for connecting said windings with the generator, and means for altering said connection to change the relation of said windings with respect to said generator.

8. The combination with a generator having a field winding and a commutating winding and means for controlling the current in said windings comprehending means for connecting said windings with the generator in such manner as to vary the potential difference across the respective windings.

9. The combination with a generator having a field winding and a commutating winding and means for controlling the current in said windings comprehending means for connecting said windings with the generator in such manner as to simultaneously vary the potential difference across the respective windings.

10. The combination with a generator having a field winding and a commutating winding in series therewith, of means for connecting said windings across the generator, and means for connecting said windings at a point of adjustable potential difference across said generator.

11. The combination with a generator having a field winding and a commutating winding in series therewith, of means for connecting said windings across the generator, means for connecting said windings at a point of adjustable potential difference across said generator, and automatic means for adjusting said connection.

12. The combination with a generator having a field winding and a commutating winding in series therewith, of means for connecting said windings across the generator, means for connecting said windings at a point of adjustable potential difference across said generator, and automatic means for adjusting said connection responsive to current fluctuations.

13. The combination with a generator having a field winding and a commutating winding in series therewith, of means for connecting said windings across the generator, means for connecting said windings at a point of adjustable potential difference across said generator, and automatic means for adjusting said connection responsive to voltage fluctuations.

14. The combination with a generator having a field winding and a commutating winding in series therewith, of means for connecting said windings across the generator, means for connecting said windings at a point of adjustable potential difference across the generator, and automatic means for adjusting said connection responsive to current and voltage fluctuations.

15. The combination with a generator having a field winding and a commutating winding in series therewith, of means for connecting said windings across the generator, means for connecting said windings at a point of adjustable potential difference across the generator, and automatic means for adjusting said connection responsive to current fluctuations, and automatic means for controlling the same in response to voltage fluctuations.

16. The combination with a generator having a commutating winding and an exciting winding in series with each other and in shunt across the generator, of means for connecting the end of one winding and the beginning of the other winding with the commutator at adjustable points with respect to the axis of commutation.

17. The combination with a generator having a commutating winding and an exciting winding in series with each other and in shunt across the generator, of means for connecting the end of one winding and the beginning of the other winding with the commutator at adjustable points with respect to the axis of commutation, and automatic means for controlling such connection.

18. The combination with a generator having a commutating winding and an exciting winding in series with each other and in shunt across the generator, of means for connecting the end of one winding and the beginning of the other winding with the commutator at adjustable points with respect to the axis of commutation, and automatic means for controlling such connection responsive to current fluctuations.

19. The combination with a generator having a commutating winding and an exciting winding in series with each other and in shunt across the generator, of means for connecting the end of one winding and the beginning of the other winding with the commutator at adjustable points with respect to the axis of commutation, and automatic means for controlling such connection responsive to voltage fluctuations.

20. The combination with a generator having a commutating winding and an exciting winding in series with each other and in shunt across the generator, of means for connecting the end of one winding and the beginning of the other winding with the commutator at adjustable points with respect to the axis of commutation, and automatic means for controlling such connection responsive to current and voltage fluctuations.

21. The combination with a generator operating at varying speeds and a storage battery charged thereby, of means for controlling the operation of said generator comprehending an exciting winding and a commutating winding operatively connected with said generator, means connecting said windings with said generator and simultaneously varying the current in both said windings to the vary current supplied to the battery and the commutating effect of the commutating winding, and automatic means for controlling said connection in response to variations in condition of the storage battery.

22. The combination with a generator operating at varying speeds and a storage battery charged thereby, of means for controlling the operation of said generator comprehending an exciting winding and a commutating winding operatively connected with said generator, means connecting said windings with said generator and simultaneously varying the current in both said windings to vary the current supplied to the battery and the commutating effect of the commutating winding, and automatic means for controlling said connection in response to variations in condition of the storage battery and in response to variations in the current supplied thereto.

23. The combination with a generator having a plurality of field coils in series with each other of means for varying the relative energization of said coils with respect to each other comprehending operating means and responsive means controlling the operation thereof affected by electrical fluctuations.

24. The combination with a generator having a plurality of field coils in series with each other of automatic means capable of varying the relative energization of said coils with respect to each other and responsive means for controlling said automatic means in response to electrical fluctuations.

25. The combination with a generator having a plurality of field coils in a series with each other of means for simultaneously varying the relative values of energization of said coils with respect to each other comprehending electromagnetic operating means and responsive means for controlling the same affected by the operation of the generator.

26. The combination with a generator having a plurality of field coils in series with each other of automatic means for simultaneously varying the relative values of energization of said coils in opposite senses with respect to each other comprehending operating means and means for controlling the same responsive to electrical fluctuations.

27. The combination with a generator having a plurality of field coils, of means for varying the energization of said coils comprehending operating means whereby the energization of certain of said coils is increased and the energization of other of said coils simultaneously decreased and electro-responsive means for controlling said operating means.

28. The combination with a generator having a plurality of field energizing coils, of means for varying the energization of said coils comprehending automatic means whereby the energization of certain of said coils is increased and the energization of other of said coils simultaneously decreased and means controlling said automatic means responsive to fluctuations in a circuit supplied by the generator.

29. The combination with a generator having a plurality of field energizing coils, of means for varying the relative energization of said coils with respect to each other comprehending automatic means whereby the energization of certain of said coils is increased and the energization of other of said coils simultaneously decreased, said automatic means comprehending operating means and means responsive to fluctuations in the output of the generator.

30. The combination with a generator having a plurality of field energizing coils, of means for varying the energization of said coils comprehending automatic means whereby the energization of certain of said coils is increased and the energization of other of said coils simultaneously decreased, said automatic means comprehending operating means and voltage and current responsive means affected by the operation of the generator and controlling said operating means.

31. The combination with a generator having a plurality of field energizing coils, of means for varying the energization of said coils comprehending automatic means whereby the energization of certain of said coils is increased and the energization of other of said coils simultaneously decreased, said automatic means comprehending operating means and voltage responsive means affected by the operation of the generator for affecting said operating means.

32. The combination with a generator having a plurality of field energizing coils, of means for varying the energization of said coils comprehending automatic means whereby the energization of certain of said coils is increased and the energization of other of said coils simultaneously decreased, said automatic means comprehending operating means and current responsive means affected by the operation of the generator for affecting the said operating means.

33. The combination with a generator having a commutator and field circuit, means for connecting an external circuit with said commutator, an external circuit including a storage battery connected therewith, and means for connecting the field circuit independently with said commutator, of electrically operated means for varying said point of connection and means controlling the same affected by fluctuations in voltage of said battery.

34. The combination with a generator having a commutator and field circuit, means for connecting an external circuit with said commutator, an external circuit including a storage battery connected therewith, means for connecting the field circuit independently with said commutator, of automatic means for varying said point of connection and means normally controlling the same affected by fluctuations in voltage of said battery and current supplied to the battery.

35. The combination with a generator having a commutator, a field exciting means, means for connecting an external circuit with said commutator, an external circuit and storage battery in connection therewith and means for connecting the field exciting means with said commutator at a point differing from that of the main circuit connection, of means cooperating therewith to vary the excitation of the field exciting means and means for affecting the same upon changes in voltage of said battery.

36. The combination with a generator having a commutator, a field exciting means, means for connecting an external circuit with said commutator, an external circuit and storage battery in connection therewith and means for connecting the field exciting means with said commutator at a point differing from that of the main circuit connection, of means tending to vary the connection of the field exciting means upon changes in voltage of said battery and responsive means affected by the electrical operation of the dynamo normally controlling the same.

JOHN L. CREVELING.